No. 842,833. PATENTED JAN. 29, 1907.
C. O. HEDSTROM.
CONVERTIBLE BICYCLE AND TRICYCLE FRAME.
APPLICATION FILED NOV. 27, 1905.
2 SHEETS—SHEET 1.
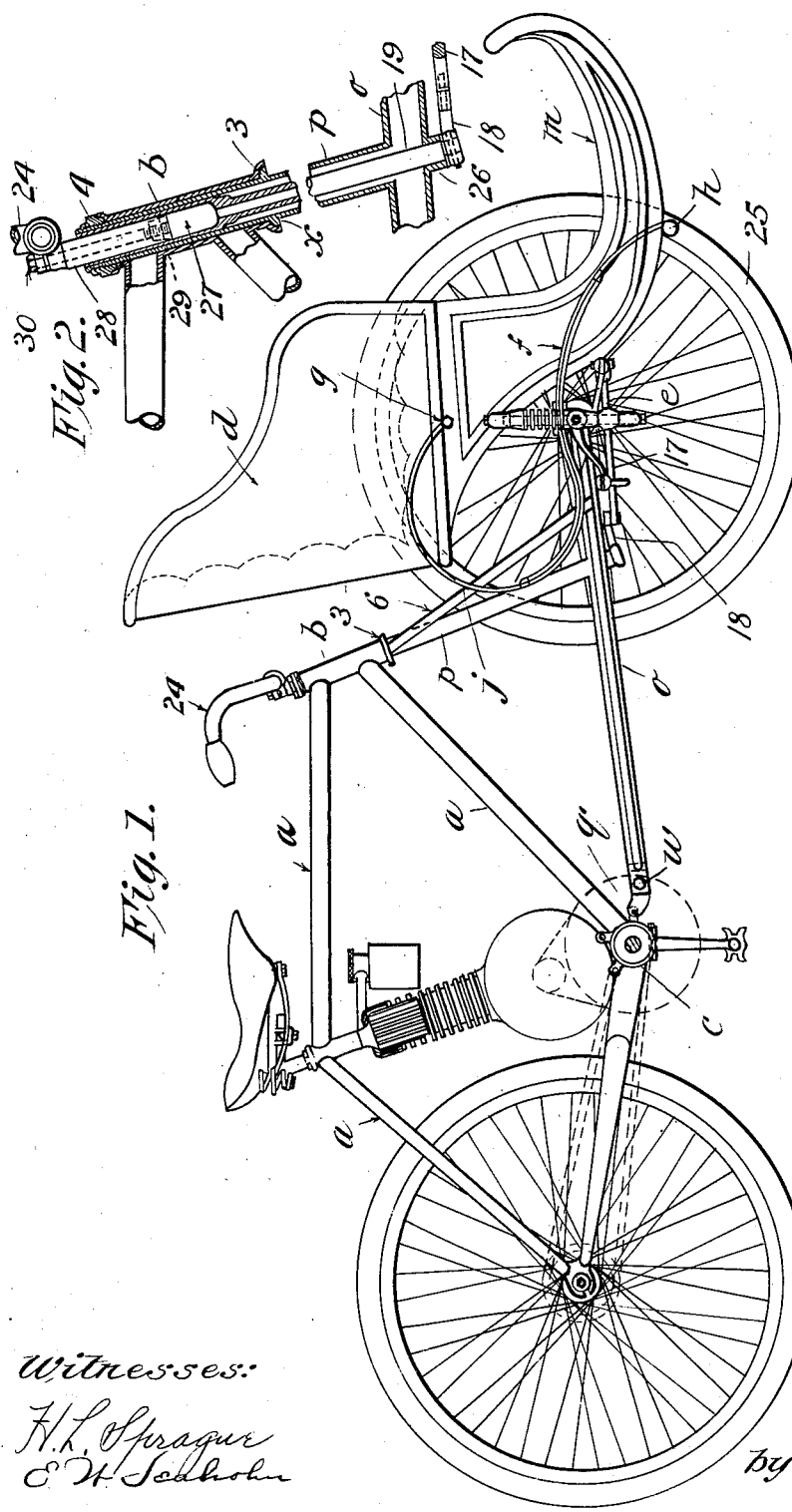
Witnesses:
H. L. Sprague
E. H. Seebohm
Inventor:
Carl O. Hedstrom
by Chapin &c
Attorneys.

No. 842,833. PATENTED JAN. 29, 1907.
C. O. HEDSTROM.
CONVERTIBLE BICYCLE AND TRICYCLE FRAME.
APPLICATION FILED NOV. 27, 1905.
2 SHEETS—SHEET 2.
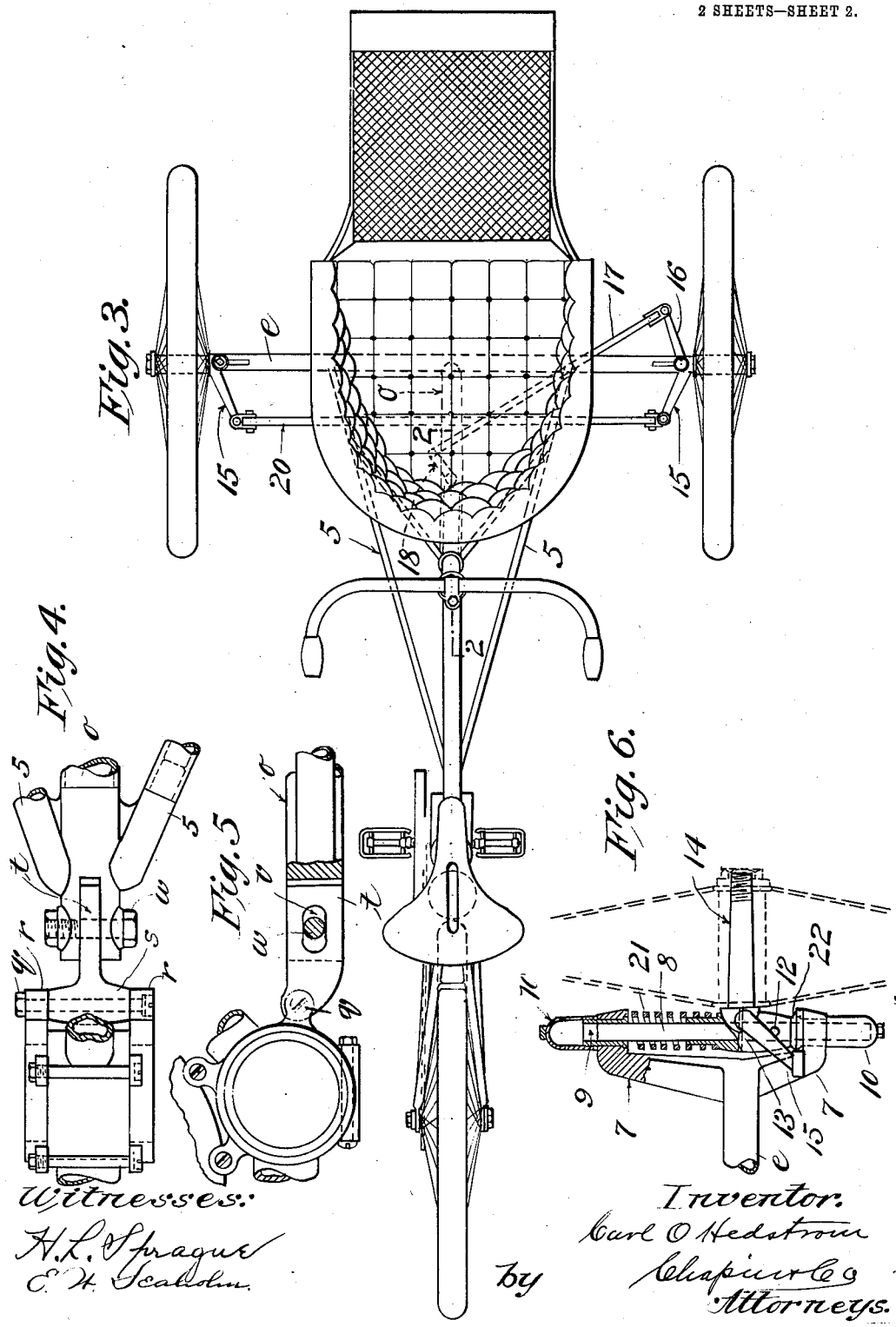

UNITED STATES PATENT OFFICE.

CARL O. HEDSTROM, OF SPRINGFIELD, MASSACHUSETTS.

CONVERTIBLE BICYCLE AND TRICYCLE FRAME.

No. 842,833.　　　　　Specification of Letters Patent.　　　　Patented Jan. 29, 1907.

Application filed November 27, 1905. Serial No. 289,357.

*To all whom it may concern:*

Be it known that I, CARL OSCAR HEDSTROM, a citizen of the United States of America, residing at Springfield, in the county of Hampden and State of Massachusetts, have invented new and useful Improvements in Convertible Bicycle and Tricycle Frames, of which the following is a specification.

This invention relates to the construction of motor-vehicles, the object of the invention being to provide for the attachment to a motor-cycle of an auxiliary frame part whereby the motor-cycle is transformed from a bicycle to a tricycle, the construction being such that it is not necessary to change any part of the motor-cycle construction to provide for the attachment of the auxiliary sociable seat or body carried in front on two wheels.

Another object of the invention is to provide in the transformed vehicle means located in the steering-head of the motor-cycle frame for simultaneously swinging the two forward wheels.

A further object of the invention is to provide a novel spring suspension for the forward seat or body of the transformed vehicle, whereby the seat is relieved from vibration, and the motor-cycle frame also, which of necessity must be connected therewith rigidly.

Still another object of the invention lies in providing a suitable means of adjustment whereby the complementary frame may be applied to the motor-cycle frame to constitute a rigid structure when the two are secured together and yet will permit the proper fitting together of the frames regardless of slight variations of proper alinement residing in either frame, all as will be fully described in the following specification and clearly pointed out in the claims appended thereto.

It should be stated here that in this construction the auxiliary seat-frame and the frame of an ordinary motor-cycle may be secured together to form a single frame by simply removing the front fork of the motor-cycle.

The term "seat" employed throughout the specification will be used for the sake of brevity; but it is intended that it shall comprise any body structure carried on the complemental frame and over the forward axle.

The invention is fully illustrated in the accompanying drawings, in which—

Figure 1 shows in side elevation a motor-cycle frame to which the complemental frame carrying the auxiliary forward seat has been applied, one of the wheels of said forward seat being removed. Fig. 2 is a sectional elevation of that part of the motor-cycle frame called the "head," showing the manner of applying thereto one member of the frame of the auxiliary seat and showing in its proper location in said member and in said head the steering-shaft. Fig. 3 is a plan view of Fig. 1, showing in addition the wheel of the auxiliary seat, not shown in Fig. 1. This view also shows clearly the construction of the steering devices. Fig. 4 is an enlarged plan view looking down on the crank-hanger of the motor-cycle and showing the method of attaching the lower horizontal member of the auxiliary seat-frame thereto and showing the provision made for the endwise adjustment of said frame to permit the proper alinement of the vertically-disposed member with the axis of the head of the motor-cycle frame. Fig. 5 is a side elevation, partly in section, of the parts shown in Fig. 4. Fig. 6 is an elevation, partly in section, showing the construction of the wheel-supports for the auxiliary seat to take up those vibrations whose force is exerted against the auxiliary seat in vertical planes.

Referring to the drawings, $a$ $a$ are the frame members of the motor-cycle; $b$, the head of said members, which constitutes the support for the front fork and handle-bars attached thereto in the usual manner, and $c$ indicates the crank-hanger. The auxiliary forward seat is indicated by $d$, which is supported on an axle $e$, on which are mounted two S-springs $f$, the opposite ends of which are secured to the seat at $g$ and $h$, as shown clearly in Fig. 1, the springs being secured to the axle $e$ by means of a suitable clip. These springs are shown only in Fig. 1, being hidden in the plan view, Fig. 3, by the overhanging sides of the seat $d$.

The backwardly-bowed portion $j$ of the springs takes the main weight of the person occupying the seat, and the forwardly-extending portion of the lower end of the springs supports the platform $m$ of the seat on which the feet rest. These springs as constructed therefore permit the seat to move vertically and permit it also to rock in a plane parallel with the plane of the motor-cycle more or less, the rear part of the seat having greater freedom of movement than the platform $m$. As shown in the plan view, the main central portion o of the seat-frame extends from about the center of the axle e back to the crank-hanger c and substantially in the plane of the motor-cycle-frame parts a. At some distance back of the axle e is an inclined tubular seat-frame part p, extending from the lower frame part o toward and through the head b of the motor-cycle frame and constituting the vertical brace between said head and the member o of the seat-frame, the rear end of said member o being secured to the crank-hanger c by a bolt q, which, as shown in Figs. 4 and 5, extends through ears r on the crank-hanger c and through a hub s, which is adjustably fitted to the end of the frame member o. The hub s may swivel on the bolt q and is provided with a tongue t, which extends into a vertically-disposed slot in the end of the member o of the seat-frame, there being, as shown in Fig. 5, an elongated slot v in said tongue, a bolt w extending through the end of the frame and through said slot. By means of this construction the lengthwise dimension of the member o may be lengthened or shortened. This is rendered necessary because it is practically impossible to build the motor-cycle frame and the auxiliary seat-frame so accurately that the distance between the point of attachment at the crank-hanger and the center of the lower end of the tubular seat-frame part p will not vary, and if there should be the slightest variation in the angle of the head or in the angle of the frame part p it would be impossible to unite the two frames in the manner shown herein without springing the parts forward or back to permit the insertion of the bolt q at the crank-hanger to secure the portion o of the seat-frame at that point. Any such springing of the frame would throw the vertical member p out of line. Therefore the member o of the seat-frame is provided with the adjustable connection just described, whereby by loosening the bolts w the tongue t may be moved as desired to permit the bolt q to be passed through the hub s, whereupon the bolt w may be tightened, and thus make the frame member o a rigid brace between the lower end of the frame member p and the crank-hanger of the motor-cycle frame.

Referring now to Fig. 2, it is seen that on this frame part p is an annular shoulder x of such shape that it will fit the ball-race 3, in which are located the balls which take the end thrust of the front fork of the motor-cycle. This shoulder x supports the forward end of the motor-cycle frame, the seat-frame part p extending through the head of that frame and being locked therein by means of a suitable nut 4, as shown in Fig. 2.

To properly brace the axle e and hold it rigidly in its rectangular position relative to the longitudinally-extending portion o of the seat-frame, the braces 5 are provided, which extend from near the rear end of said part o on each side thereof to a point on the axle e between the end thereof and the center. These braces provide for the strains to which the frame is subjected in substantially horizontal planes, and to properly support the motor-cycle frame and the frame member p of the auxiliary seat-frame in a fixed plane rectangularly vertical to the axle e two downwardly and forwardly inclined braces 6 are provided, which extend one from each side of the frame member p from under the shoulder x thereon to the horizontal braces 5, to which they are secured not far from the point of union of the latter with the axle. These frames are constructed in the manner common to all tubular frame constructions of this character by brazing the parts together.

It is to be understood that the invention does not reside particularly in the specific form of frame construction described herein except in so far as such construction comprises elements to permit the union of the seat-frame with the motor-frame substantially in the manner described. The construction of the frame itself may be varied.

From the foregoing description it is seen that the union of the two frames—that is, the seat-frame and the motor-cycle frame—results in the production of a rigid tricycle-frame structure. Of course when the motor-cycle is used as such the spring-supported saddle and the spring-fork commonly used in these vehicles provide means to relieve the rider of the vibrations due to unevenness of the road; but when the spring-fork is removed and the rigid frame of the auxiliary seat is united to the motor-frame in the manner described it becomes necessary not only for the comfort of the rider of the motor-cycle, but also of the person occupying the auxiliary seat, to relieve the auxiliary seat and the forward end of the motor-cycle frame of such vibrations, and this is accomplished by the use of springs, certain of which (already described) support the auxiliary seat d on the axle and others, about to be described, are located between the axle and the wheel and serve, primarily, as springs to relieve the forward end of the motor-cycle and the frame of the auxiliary seat from the vibrations set up by the unevenness of the road.

It may be stated here that it is only by reason of a construction which permits of overcoming these vibrations that the auxiliary-seat construction shown herein for use in connection with a motor-cycle becomes commercially possible.

The construction about to be described is illustrated most clearly in Fig. 6, and reference may be had also to Figs. 1 and 3 for further illustration as to certain features not shown in Fig. 6. Referring, however, to the last-named figure, it is seen that on the end of the axle e a vertically-disposed yoke 7 is constructed, the arms of which extend above and below the axle, and through the ends of this yoke concentric holes are bored to receive a spindle 8, which extends through the yoke, and at each end, as shown, suitable bearing-bushings 9 are provided therefor in the yoke, the open ends of these being covered by long caps 10, secured to opposite ends of the yoke. Secured to this spindle by a pin 12 or in any other suitable way is a knuckle 13, provided with a short shaft 14, extending outwardly therefrom parallel with the axle to receive a wheel and normally substantially in line with the axle, and also on this knuckle is a steering-arm 15, which extends, as shown in Fig. 3, rearwardly and somewhat inwardly relative to the axis of the spindle, and preferably this arm trends downwardly, as shown in Fig. 6.

Each of the knuckles 13 is identical with respect to the wheel-shaft 14 and the arm 15; but on one of these knuckles, as shown in Fig. 3, on the right-hand end of the shaft, there is a second arm 16, extending, preferably, forward from the axis of the spindle, (also somewhat inwardly,) which by means of a rod 17 is connected with a crank-arm 18 on the bottom of the steering-shaft 19, which construction is clearly shown in Figs. 1 and 3, with the exception of the steering-shaft 19, which appears only in Fig. 2.

The two arms 15 of the knuckle are united by a connecting-rod 20. Between the upper end of the knuckles 13 and the under side of the upper end of the yoke 7 is located an open spiral spring 21, which will under normal condition hold the knuckle to a seat against the upper side of the lower jaw of said yoke 7, as shown in Fig. 6, and between the lower end of said knuckle and the surface of said jaw is a washer 22, made of some material which will prevent the hammering of the lower end of the knuckle against the jaw of the yoke during any movement of the knuckles toward and away from said jaw.

From this description it is seen that the entire weight of the forward end of the motor-cycle frame and all of the weight carried on the front seat, together with the weight of the frame of the auxiliary seat, is supported on the springs 21, and therefore all of the rapid vibrations arising from running the vehicle are taken up by these springs and not communicated to the frame of the machine or to the seat $d$. The latter, however, being located directly over the axle $e$ makes it desirable to interpose still another spring between the axle and said seat, which are the springs $f$, already described. These serve as auxiliary means to take the shock of the vibrations off of the seat $d$ and, as described, have the further function of permitting rocking motion to the seat in the plane of the frame.

Steering: The frame of the composite vehicle constructed in the manner described permits the use of a handle-bar 24 for steering by means of the front wheels 25 of the auxiliary front seat without any change except the substitution for the front fork of the cycle-frame of the long steering-shaft 19, (shown in detail in Fig. 2,) to the lower end of which the crank-arm 18 is secured instead of securing the handle-bars to the tubular neck of the front fork of the motor-cycle. Preferably this steering-shaft is made as shown in Fig. 2, the lower end thereof extending through a bearing 26, formed on the under side of the horizontal frame member $o$, whereby the lower end of the shaft may be steadied, the upper end being enlarged to have a sliding fit in the interior of the vertical frame part $p$ and provided with a chambered-out end 27, into which the shank 28 of the handle-bar is fitted, said shank being secured tightly in the upper chambered end of the steering-shaft by the expansive effect of a tapered head 29, drawn into the lower end of said shank by a bolt 30 in the usual manner, the lower end of the shank being split longitudinally. Any other manner, however, of securing the handle-bar, which might be employed in connection with the neck of the front-wheel fork, may be likewise employed to secure the handle-bar to the steering-shaft 19.

From the foregoing description it is clear that to convert the motor-cycle into a tricycle "sociable," as it is called, it is only necessary to remove the front fork and wheel of the motor-cycle and pass the upper end of the frame member $p$ through the head $b$ of the motor-cycle frame and secure the end of the horizontally-disposed frame member $o$ to the crank-casing, the handle-bars 24 of the motor-cycle being used interchangeably either in connection with the fork or with the steering-shaft of the auxiliary seat-frame as desired.

It should be noted that after the vertical member $p$ of the auxiliary frame has been located properly in the head $b$ the application thereto of the nut 4 serves to hold said frame member in the head $b$ rigidly.

Having thus described my invention, what I claim, and desire to secure by Letters Patent of the United States, is—

1. The combination with the frame of a motor-cycle, of a complemental frame to carry an auxiliary seat forwardly of the motor-cycle, said complemental frame comprising a vertically-disposed member to be rigidly secured in the head of the motor-cycle frame in place of the front fork, and a longitudinally-disposed frame part to connect with the lower part of the motor-cycle frame, an axle on the complemental frame provided with yokes; vertical spindles in the yokes, steering-knuckles on said spindles, on which wheels are supported, and a spring bearing on said knuckles to support the frame, together with steering means to swing the wheels on said axle in unison.

2. The combination with the frame of a motor-cycle, of a complemental frame carrying an auxiliary seat forwardly of the motor-cycle and comprising an axle transversely disposed relative to the motor-cycle frame, wheels on the ends of said axle to rotate on a vertical axis and movable in the direction of said axis, suitable springs between the wheels and a part of the axle to support the latter and one end of said complementary frame, a device to swing the wheels in unison to steer the vehicle, together with other parts of the complementary frame, one to fit the head of the motor-cycle frame and the other for attachment to said frame, at or near the crank-hanger, comprising a slotted horizontally-extending member, and a hub member adapted for attachment to the crank-hanger, as described.

3. The combination with the frame of a motor-cycle, of a complemental frame carrying an auxiliary seat forwardly of the motor-cycle and comprising an axle transversely disposed relative to the motor-cycle frame, frame parts extending one to the head and the other to the crank-hanger of the motor-cycle, and being secured thereto; an auxiliary seat located above the axle and spring-supported thereon, the springs being substantially S-shaped and attached to the rear and forward part of the auxiliary seat, wheels on the ends of said axle and movable in a direction vertical thereto, and suitable springs between the wheels and a part of the axle constituting a support for the latter and the forward end of said complementary frame.

4. The combination with the frame of a motor-cycle, of a complemental frame carrying an auxiliary seat forwardly of the motor-cycle and comprising an axle transversely disposed relative to the motor-cycle frame, frame parts extending one to the head and the other to the crank-hanger of the motor-cycle, and being secured thereto; an auxiliary seat located above the axle and spring-supported thereon, and springs attached to the rear and forward part of the auxiliary seat, wheels on the ends of said axle, and suitable springs between the wheels and a part of the axle constituting a support for the latter and the forward end of said complementary frame.

CARL O. HEDSTROM.

Witnesses:
WM. H. CHAPIN,
K. I. CLEMONS.